United States Patent
Fragiacomo et al.

(10) Patent No.: US 12,466,780 B2
(45) Date of Patent: Nov. 11, 2025

(54) PROCESS FOR PURIFYING BIS(2-HYDROXYETHYL)TEREPHTHALATE

(71) Applicant: Chempet S.r.l, Cerano (IT)

(72) Inventors: Guido Fragiacomo, Cerano (IT); Marco Casarotti, Cerano (IT); Gianluigi Noja, Cerano (IT)

(73) Assignee: Chempet S.r.l, Cerano (IT)

( * ) Notice: Subject to any disclaimer, the term of this patent is extended or adjusted under 35 U.S.C. 154(b) by 744 days.

(21) Appl. No.: 17/783,680

(22) PCT Filed: Dec. 16, 2020

(86) PCT No.: PCT/IB2020/062026
§ 371 (c)(1),
(2) Date: Jun. 9, 2022

(87) PCT Pub. No.: WO2021/124149
PCT Pub. Date: Jun. 24, 2021

(65) Prior Publication Data
US 2023/0067221 A1 Mar. 2, 2023

(30) Foreign Application Priority Data
Dec. 20, 2019 (IT) .................. 102019000025039

(51) Int. Cl.
*C07C 67/56* (2006.01)
*B01J 20/20* (2006.01)
*B01J 20/28* (2006.01)
*C07C 67/60* (2006.01)
*C08J 11/24* (2006.01)

(52) U.S. Cl.
CPC .............. *C07C 67/60* (2013.01); *B01J 20/20* (2013.01); *B01J 20/28004* (2013.01); *B01J 20/28016* (2013.01); *B01J 20/28061* (2013.01); *B01J 20/28064* (2013.01); *B01J 20/28066* (2013.01); *C07C 67/56* (2013.01); *C08J 11/24* (2013.01); *C08J 2367/02* (2013.01)

(58) Field of Classification Search
CPC ......... C07C 67/56; C07C 67/60; C07C 69/82; B01J 20/20; B01J 20/28004; B01J 20/28016
See application file for complete search history.

(56) References Cited

U.S. PATENT DOCUMENTS

| | | |
|---|---|---|
| 3,222,299 A | 12/1965 | Macdowell et al. |
| 4,609,680 A | 9/1986 | Fujita et al. |
| 6,630,601 B1 | 10/2003 | Inada et al. |
| 2004/0182782 A1 | 9/2004 | Inada et al. |
| 2009/0133200 A1 | 5/2009 | Mukai et al. |
| 2019/0016860 A1 | 1/2019 | Searcy et al. |

FOREIGN PATENT DOCUMENTS

| | | | | |
|---|---|---|---|---|
| CN | 10726664 A | † | 10/2017 | |
| CN | 107266664 A | * | 10/2017 | ........... C07C 67/317 |
| EP | 0723951 A1 | | 7/1996 | |
| EP | 1234812 A1 | | 8/2002 | |
| EP | 2784110 | | 10/2014 | |
| GB | 1134949 A | * | 11/1968 | ............. C07C 67/60 |
| JP | 2004-269602 A | † | 9/2004 | |
| JP | 2008-88096 A | † | 4/2008 | |
| JP | 2008088096 A | * | 4/2008 | ............. C07C 67/29 |
| JP | 2009120568 A | | 6/2009 | |
| WO | WO-2017111602 A1 | | 6/2017 | |

OTHER PUBLICATIONS

JP208088096(A), Inada, S., Method for producing Bis-(2-hydroxyethyl)terephthalate and method for producing polyethylene terephthalate, English translation, 35 pages (Year: 2008).*
CN107266664 (A), Lou Hong, Polyethylene terephthalate waste recovery process, English translation, 14 pages (Year: 2017).*
"Activated Carbon", Pureflow TechNotes, Summer 2018, 4 pages.
"Activated Charcoal", Nanjing Reagent Inc., 2015, 2 pages (with Statement of Relevance).
"The visible spectrum", Encyclopedia Britannica, 1994, 8 pages.
Francisco A.P. Costa et al, "Bleaching and photodegradation of textile dyes by H2O2 and solar or ultraviolet radiation", Solar Energy 77, Science Direct, 2004, pp. 29-35.
Third Party Observation issued Jul. 4, 2023 in European Patent Application No. 20824688.4, 75 pages.
International Search Report and Written Opinion issued Feb. 25, 2021 in PCT/IB2020/062026, 10 pages.
Office Action issued Aug. 26, 2025, in corresponding Korean Patent Application No. 10-2022-7017989 (with English translation), 68 pages.

* cited by examiner
† cited by third party

*Primary Examiner* — Yate' K Cutliff
(74) *Attorney, Agent, or Firm* — Element IP, PLC

(57) ABSTRACT

Process for purifying bis(2-hydroxyethyl)terephthalate (BHET) obtained from depolymerization of a polyethylene terephthalate (PET) waste, the process comprising: treating said solution with at least one oxidizing agent at a temperature of from 30° C. to 100° C., preferably from 50° C. to 90° C., to obtain an oxidized solution; treating the oxidized solution with at least one adsorbing agent to obtain a purified oxidized solution; separating the at least one adsorbing agent from the purified oxidized solution to obtain a purified BHET solution. This process is particularly effective for eliminating organic dyes and other low molecular weight organic contaminants, so as to achieve a high purity degree of the recovered BHET.

17 Claims, No Drawings

PROCESS FOR PURIFYING BIS(2-HYDROXYETHYL)TEREPHTHALATE

The present invention relates to a process for purifying bis(2-hydroxyethyl)terephthalate (BHET), particularly BHET obtained from depolymerization of polyethylene terephthalate (PET) waste.

Polyethylene terephthalate (PET) is a widely employed semi-crystalline thermoplastic polyester having high strength and transparency, which has several applications due to its physical and chemical properties, particularly in packaging and fiber production. PET does not cause any safety hazard, but increasing consumption and accumulation in waste streams and non-biodegradability of the same generate environmental and economic concerns. Therefore, there is a growing interest in PET recycling technologies.

PET is considered a polymeric material that can be readily recycled and its recycling is the most widespread among polymer materials. Technologies can be grouped in two macro-categories: mechanical and chemical recycling.

Mechanical recycling consists mainly in obtaining flakes, by waste sorting, removal of contaminants, crushing and grinding, which are directly sent to extrusion for producing new articles. The main issues of this technology are due to heterogeneity of the solid waste and low quality of the final product, since the PET properties are downgraded each time it is recycled.

Chemical recycling involves decomposition of the polyester by using a reactant able to depolymerize the PET chains to obtain the starting monomers; chemical depolymerization of PET is usually obtained by solvolysis, particularly by hydrolysis or methanolysis or glycolysis.

Hydrolysis depolymerizes PET to terephthalic acid (TPA) and ethylene glycol (EG) (called also mono ethylene glycol—MEG) by reaction with water. Methanolysis degrades PET to dimethyl terephthalate (DMT) and EG by reaction with methanol. Glycolysis causes depolymerization by reaction with EG, to produce bis(2-hydroxyethyl) terephthalate (BHET), an intermediate formed at a first stage of PET production from the starting monomers.

To date mechanical recycling is still the most used technology for PET waste treatment and there are only few industrial applications of chemical recycling. However, a growing interest is noticed for chemical recycling technologies as they are in accordance to sustainable development principles, bringing back to virgin PET raw materials, which of course are of much higher quality compared to mechanically recycled PET.

To better understand the basis of chemical recycling, the fundamentals of PET production and glycolysis are reported below.

Industrially PET is obtained from two separated reaction stages. At the first stage, the starting products react to produce BHET and oligomers, then chain growth occurs in a separated reaction step.

Two different raw materials may be used to produce PET: (a) via acid, TPA and EG react to produce BHET and water; or (b) via ester, dimethylterephthalate (DMT) and EG react to produce BHET and methanol. Subsequently, BHET, produced through the esterification or transesterification stage, reacts to produce PET through a polycondensation reaction; in this step, EG evolves and can be separated from the reaction mixture:

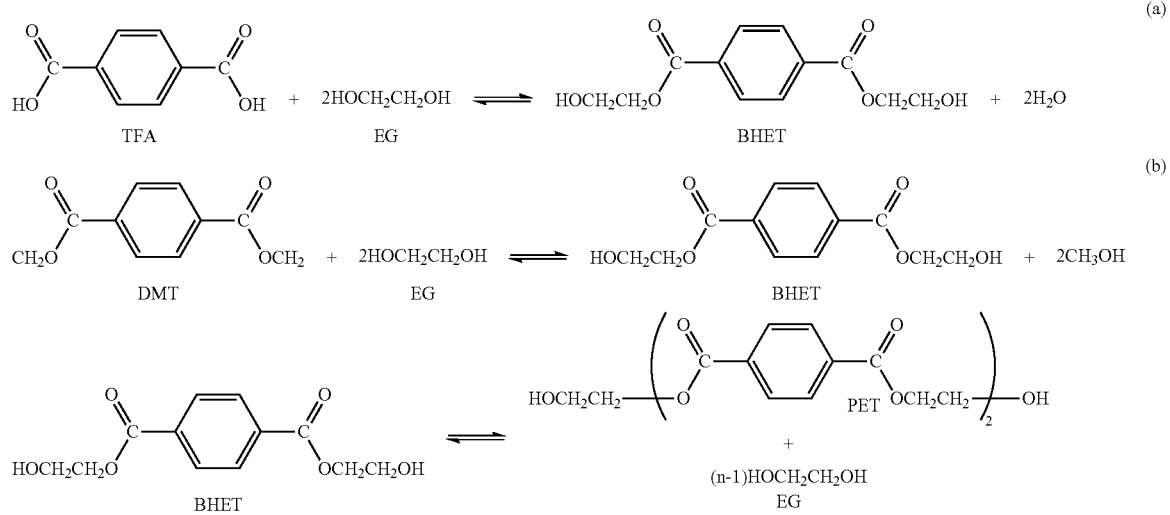

Polycondensation is an equilibrium reaction and EG is produced as by-product with PET. It is therefore necessary to move the equilibrium towards PET by evaporating the evolved EG.

The reverse reaction may be used to produce BHET starting from PET: the reaction of PET with EG causes chain scission by attacking the ester bond. Since PET is formed through a reversible polycondensation reaction, the polymer can be transformed back to its monomer or oligomers by shifting the reaction to the opposite direction by adding EG.

During this reverse reaction, called glycolysis, polymer chains are transformed by means of a solvolytic chain cleavage leading to a theoretically complete depolymerization back to the monomer (BHET) or to a partial depolymerization to the monomer along with oligomers:

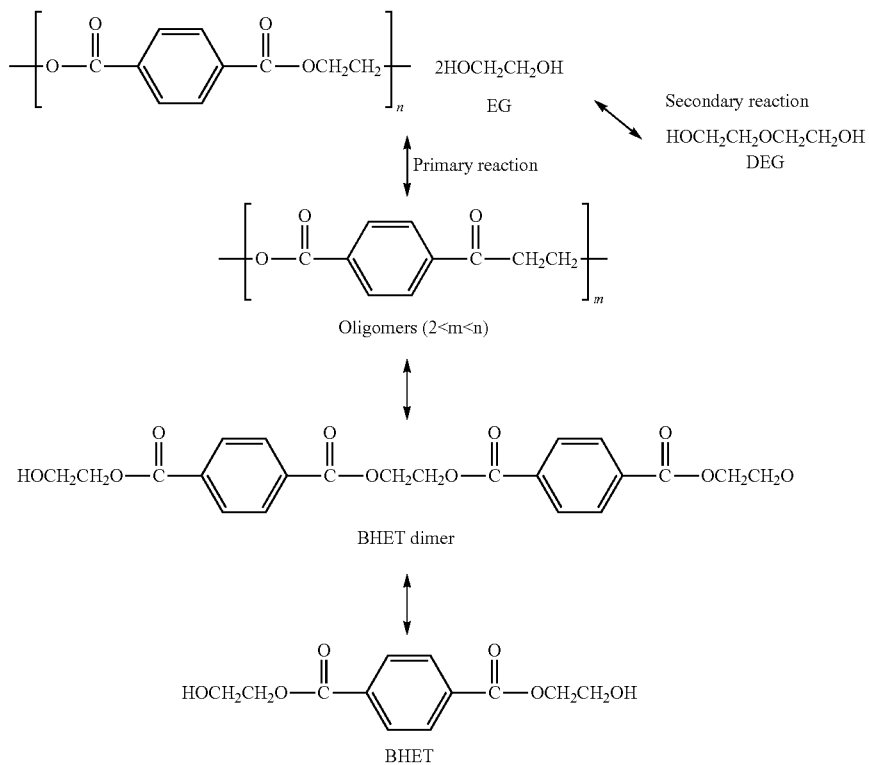

The reaction is slightly endothermic and reversible; therefore, it can be pushed towards the monomer/oligomers production by working with an excess of EG with respect to the starting PET.

The whole glycolysis reaction can be divided into two steps: (i) EG splits the ester bonds in the PET chain and oligomers are formed and solubilized in the EG itself; (ii) oligomers are at equilibrium with BHET, therefore the reaction is moved towards BHET formation by adding an excess of EG.

Without using a catalyst, the glycolysis reaction is slow, and a complete depolymerization of PET to BHET is difficult to be achieved in a time acceptable for an industrial process. Therefore, usually a transesterification catalyst is used, which should ensure shorter reaction times at lower temperatures than the uncatalyzed reaction, and a yield increase is achieved by removing or minimizing any side reactions which may affect the whole process. Possible catalysts are disclosed e.g. in U.S. Pat. No. 6,630,601 and WO 2017/111602. The glycolysis catalyzed reaction is usually carried out at a temperature of from 190° C. to 250° C.

To be used for the production of virgin PET, the BHET obtained from glycolysis of PET waste must be thoroughly purified, since it contains various contaminants which may interfere with the polymerization reaction, such as organic dyes used for colored PET, antistatic agents, stabilizers, ultraviolet absorbers. Moreover, the BHET may contain contaminants which are insoluble in the glycolysis medium, such as aluminum fragments, polyolefins, fillers (such as titanium oxide, carbon black, silicates and other pigments), adhesives, and the like. The insoluble contaminants may be separated by filtration. Other contaminants are barrier polymers which are used in the production of multilayered materials for food applications.

As regards organic dyes and other low molecular weight organic contaminants, they may be present in the PET waste as mixtures of different compounds in amounts variable from batch to batch. Their elimination may show different degrees of difficulty and therefore may require different treatments to achieve the same final quality of the purified BHET.

A possible approach to achieve a purified BHET is that of treating the starting PET waste to separate or decompose undesired materials such as dyes.

For instance, EP 2 784 110 A1 relates to a method for preprocessing PET flake prior to depolymerization by glycolysis and/or methanolysis and/or hydrolysis and/or saponification. Such method includes extracting organic colorants from the PET flake and simultaneous embrittlement of the PET flake by contacting the same with EG.

US 2009/0133200 relates to a method for recovering useful components from a dyed polyester fiber, comprising a dye extraction step, a solid liquid separation step, a depolymerization reaction step, an ester interchange reaction step, and a useful component separation step. The dye extraction step is a step of extracting and removing a dye at the glass transition temperature of the polyester or higher and at 220° C. or less by an extracting solvent including xylene and alkylene glycol from the dyed polyester fiber.

US 2019/0016860 relates to a method for decolorizing a polymer by mixing a solution of the polymer with a photocatalyst and exposing the mixture to ultraviolet light.

Such processes are scarcely effective in achieving a high purity degree of the final BHET, and moreover they are quite cumbersome and may cause undesired degradation of the polymer with formation of degradation by-products.

Various methods have been proposed to purify BHET obtained by depolymerization of PET waste.

For instance, US 2004/0182782 A1 relates to a method of purifying BHET by subjecting a solution obtained from decomposition of PET to crystallization and solid-liquid separation under specific temperature conditions. The solution is previously subjected to an impurity removing treatment which includes a removal of solid foreign material (e.g. by filtration under heating), a decolorization treatment with activated carbon, and a deionization treatment with an ion exchange resin.

EP 1 234 812 A1 relates to a method for purifying crude BHET obtained from decomposition of PET by means of an alcohol or glycol in the presence of a catalyst. The process includes a filtration step, a treatment with activated carbon, and a treatment with an ion-exchange resin.

U.S. Pat. No. 6,630,601 B1 relates to a process for producing BHET which comprises bringing a BHET solution composition comprising EG, BHET and cations and/or anions as impurities into contact with a cation exchanger and/or an anion exchanger to reduce the total content of cations and anions as impurities to 50 ppm or less, based on the BHET. Then, the so treated BHET solution is subjected to preliminary evaporation or distillation to distill off a compound having a boiling point lower than that of BHET, and then to evaporation or distillation under reduced pressure to give purified BHET.

The Applicant has faced the problem of providing a process for purifying bis(2-hydroxyethyl)terephthalate (BHET), particularly BHET obtained from depolymerization of PET waste, which is particularly effective for eliminating organic dyes and other low molecular weight organic contaminants, so as to achieve a high purity degree of the recovered BHET. Such process should be effective on a wide range of contaminants, without causing an unacceptable loss in the recovered BHET, which can then be used as monomer for polymerization reactions, particularly to produce virgin PET of high transparency. Moreover, the process should be effectively carried out on high amounts of BHET without causing an unacceptable increase in production costs.

Therefore, according to a first aspect, the present invention relates to a process for purifying bis(2-hydroxyethyl) terephthalate (BHET), which comprises:
  providing a crude BHET solution obtained from depolymerization of a polyethylene terephthalate (PET) waste;
  treating said solution with at least one oxidizing agent at a temperature of from 30° C. to 100° C., preferably from 50° C. to 90° C., to obtain an oxidized solution;
  treating the oxidized solution with at least one adsorbing agent to obtain a purified oxidized solution;
  separating the at least one adsorbing agent from the purified oxidized solution to obtain a purified BHET Solution As regards the crude BHET solution, it is preferably obtained from depolymerization of PET waste by a glycolysis reaction. The glycolysis reaction is usually carried out by reacting the PET waste with ethylene glycol (EG).

The glycolysis reaction is usually carried out in the presence of a heterogeneous transesterification catalyst. The catalyst may be selected, for instance, from: carbonates, fatty acid salts or borates of Na, Mg, Zn, Cd, Mn, Co, Ca or Ba (e.g. zinc borate, zinc acetate, sodium carbonate).

Preferably, the glycolysis reaction is carried out at a temperature of from 170° C. to 270° C., more preferably from 195° C. to 210° C.

In the glycolysis reaction, EG is generally used in an amount of from 1.0 to 10.0 parts by weight, preferably from 1.5 to 6.0 parts by weight, based on the parts by weight of the PET waste.

The duration of the glycolysis reaction may vary within ample ranges, depending on reaction conditions, such as temperature, stirring, type of reactor and the like. Usually the reaction time is of from 1 to 8 hours, preferably from 1.5 to 3 hours. The reaction may be carried out batchwise or continuously. The reaction pressure is usually atmospheric pressure, however a reduced or increased pressure may be used.

Further details relating to glycolysis reaction of a PET waste to recover BHET are reported, for instance, in U.S. Pat. Nos. 3,222,299, 4,609,680 and EP 0 723 951 A1.

The PET waste may be post-consumer and/or post-industrial PET waste, which may derive from a large variety of applications such as:
  PET transparent and/or colored bottles for water, soft drinks, carbonated drinks, and the like;
  PET opaque articles, wherein PET contains fillers, such as titanium oxide, carbon black, silicates and other pigments;
  multilayer PET articles, typically for food industry, wherein PET layers are coupled with layers of gas barrier polymers (e.g. nylon, polyvinylalcohol (EVOH), polyvinylacetate (EVA)) or metal foils (e.g. aluminum foils) or polyolefin foils;
  printed PET foils;
  PET fibers.

The product obtained from the glycolysis reaction is a crude BHET solution, wherein BHET is dissolved in EG together with various contaminants which derive from the specific composition of the PET waste. Usually, the crude BHET solution contains also BHET oligomers, preferably dimers and/or trimers.

In the present description and in the appended claims, the total amount of BHET in a BHET solution is calculated on the basis of BHET (monomer) and all its oligomers.

The contaminants are ingredients of the PET waste or derivatives obtained by glycolysis of such ingredients, such as:
  dyes, usually organic dyes;
  inks;
  adhesives and glues;
  polyolefins, e.g. polyethylene or polypropylene used for producing caps;
  PET-G;
  biodegradable polymers, e.g. PLA;
  gas barrier polymers, e.g. polyamides, polyvinylalcohol (EVOH), polyvinylacetate (EVA);
  UV absorbers;
  fillers, e.g. titanium dioxide, carbon black, silica, silicates and other pigments;
  metal foils and fragments thereof, e.g. aluminum foils.

The contaminants may be dissolved in EG or may be in suspension, if they are not soluble in EG.

The contaminants that are not dissolved in EG, such as fillers, adhesives, polyolefins and aluminum film, are preferably separated from the crude BHET solution, usually by filtration, before subjecting the same to the oxidation step.

To reduce solubility of some contaminants in the crude BHET solution, such as polyamides, glues and the like, the crude BHET solution is preferably added with water, so as to allow precipitation of such insoluble contaminants, but maintaining BHET and its oligomers in solution. The insoluble contaminants are then separated from the crude BHET solution, usually by filtration. This is advantageous in order to reduce the amount of contaminants which are then subjected to the oxidation step, thus allowing to reduce the amount of the oxidizing agent to be used. In the resulting crude BHET solution after filtration, the BHET and its oligomers are dissolved in a mixture of water and EG.

After separating the insoluble contaminants, the crude BHET solution may be directly subjected to the oxidation step. Alternatively, the crude BHET solution may be cooled, usually to a temperature from 10° C. to 30° C., preferably from 15° C. to 20° C., to cause precipitation of BHET and its oligomers, which are then separated (e.g. by filtration), dissolved in hot water (usually at 75° C.), and then subjected to the oxidation step. In this way, EG is removed and the oxidation step is carried out on a solution of BHET and its oligomers in water.

The main contaminants which are dissolved in the crude BHET solution are organic dyes. Usually they are disperse dyes, which are hydrophobic and thus dissolved in the polymer matrix to form a solid-solid solution. Examples of disperse dyes are Disperse Blue 165, Direct Red 81 and Pigment Yellow 14. They are aromatic compounds which are able to absorb light in the visible wavelength range (400-700 nm).

Another class of dyes used for coloring PET are azo dyes, which are characterized by the presence of nitrogen double bonds (—N=N—) which connect aromatic rings. To evaluate the amount of dyes contained in the crude BHET solution to be treated, the total absorbance of a sample at predetermined wavelengths may be used) ($\Sigma abs^0$), which can be determined by a spectrophotometer operating in the desired wavelength range. Usually, to cover the visible range, the selected wavelengths are: 475, 510, 590, 650 nm, therefore:

$$\Sigma abs^0 = abs_{475} + abs_{510} + abs_{590} + abs_{650}.$$

The spectrum of the sample of a BHET solution is registered as follows. A fixed amount of the BHET solution is heated in a thermo-balance to evaporate the solvent. The so obtained solid is weighted and dissolved in dimethyl sulphoxide (DMSO) to obtain a weight ratio BHET:DMSO equal to 1:1. The so obtained solution is placed in an optical glass tube (optical path: 1.5 cm) and inserted into a spectrometer for determining the UV-VIS spectrum.

In the following Table 1 some typical values of $\Sigma abs^0$ are reported for crude BHET solutions obtained by glycolysis of some post-industrial and post-consumer PET wastes:

TABLE 1

| PET waste | $abs_{475}$ | $abs_{510}$ | $abs_{570}$ | $abs_{590}$ | $abs_{650}$ | $\Sigma abs^0$ |
|---|---|---|---|---|---|---|
| 1 blue flakes (50% w) + colored fines (50% w) | 1.006 | 0.985 | 0.997 | 0.979 | 0.578 | 4.545 |
| 2 blue flakes (85% w) + colored fines (15% w) | 0.517 | 0.537 | 0.612 | 0.624 | 0.372 | 2.662 |
| 3 colored fines | 1.394 | 1.355 | 1.402 | 1.411 | 0.780 | 6.342 |
| 4 V PET | 0.615 | 0.524 | 0.497 | 0.442 | 0.180 | 2.258 |
| 5 V PET (33%) + blue flakes (33%) + colored fines (33%) | 0.922 | 0.933 | 0.931 | 0.890 | 0.514 | 4.190 |
| 6 V PET (50%) + blue flakes (25%) + colored fines (25%) | 0.580 | 0.437 | 0.427 | 0.451 | 0.314 | 2.209 |
| 7 V PET (50%) + blue flakes (25%) + colored fines (25%) | 2.665 | 2.007 | 1.645 | 1.650 | 1.146 | 9.113 |
| 8 V PET (50%) + blue flakes (25%) + colored fines (25%) | 2.665 | 2.007 | 1.645 | 1.650 | 1.146 | 9.113 |

More specifically, the absorbance values reported in Table 1 refer to the following crude BHET solutions:
(i) crude BHET solutions in water (products 1 to 6): they are obtained by adding water to the crude solution obtained after glycolysis of the PET waste, removing the insoluble contaminants by filtering, precipitating BHET and its oligomers by cooling, separating and then dissolving BHET and its isomers in hot water;
(ii) crude BHET solution in water and EG (product 7): it is obtained by adding water to the crude solution obtained after glycolysis of the same PET waste of product 6 and removing the insoluble contaminants; in this case BHET and its oligomers are not precipitated, separated and dissolved as reported above; the contaminants charge is higher than in product 6, since BHET and its isomers are not purified by precipitation;
(iii) crude BHET solution in EG (product 8): it is the crude solution obtained after glycolysis of the same PET waste of products 6 and 7, without adding water and/or precipitating BHET and its oligomers to achieve a higher purity degree; the contaminants charge is substantially the same of product 7.

As shown in Table 1, the crude BHET solutions may differ within a wide range as regards the degree of coloring, measured as $\Sigma abs^0$, depending on the starting PET waste and on the possible displacement of EG with water.

Usually, the total absorbance of the crude BHET solution ($\Sigma abs^0$) is from 1.5 to 12.0, preferably from 2.0 to 10.0.

The crude BHET solution, possibly pretreated as described above, is then subjected to the oxidation step. The oxidizing agent is preferably selected from inorganic oxidizing agents, such as: alkali metal or alkaline-earth metal chlorites or hypochlorites; alkali metal or alkaline-earth metal persalts, preferably persulphates; potassium permanganate; hydrogen peroxide; ozone; chlorine gas; or mixtures thereof. Preferably the alkali metal is sodium or potassium, and the alkaline-earth metal is magnesium, calcium or barium.

Particularly preferred are: sodium or potassium hypochlorite or chlorite; chlorine gas; hydrogen peroxide; or mixtures thereof.

As regards chlorine gas, it exerts an oxidizing action similar to hypochlorites and chlorites, with the advantage of not introducing metal ions in the reaction mixture, as occurs with hypochlorites and chlorites, which are used in the form of salts. On the other side, chlorine gas cannot be dispersed in the atmosphere and thus requires an abatement system for the reaction outgassing, such as traps containing a reducing agent, such as sodium metabisulfite.

To improve efficacy of hydrogen peroxide, it can be used in combination with UV radiation. To this purpose, the treated solution is irradiated with an UV lamp, usually with a radiation wavelength of from 150 nm to 400 nm.

The oxidizing agent is preferably used in an amount of from 0.005% to 5% by weight, preferably from 0.01% to 3% by weight, with respect to the weight of BHET in the crude BHET solution.

According to a preferred embodiment, in case of crude BHET solutions having a high contaminants charge, it may be advantageous to use a combination of oxidizing agents, which may be used together or, preferably, in sequence, so as to achieve a complete oxidation of the contaminants. Particularly preferred is a combination of sodium hypochlorite (or sodium chlorite) and hydrogen peroxide, which are used sequentially.

After completion of the oxidation reaction, the resulting oxidized solution is treated with at least one adsorbing agent to obtain a purified oxidation solution.

With the term "adsorbing agent" it is meant a solid material, usually in a powder form, which is able to adsorb on its surface organic molecules dispersed or solubilized in a liquid medium, so as to sequester and eliminate such molecules by separating the adsorbing agent from the liquid medium.

The aim of the treatment with at least one adsorbing agent is that of removing the degradation products formed in the solution during the oxidation step and other possible contaminants present in such solution, such as the remaining additives which have not been degraded during oxidation. Moreover, the adsorbing agent may be useful to eliminate the by-products deriving from the oxidizing agent, such as chloride ions.

Preferably, the adsorbing agent is an activated carbon or a silica.

Preferably, the adsorbing agent has a particle size from 50 to 500 mesh, more preferably from 100 to 350 mesh, measured according to ASTM Standard D286²/16.

Preferably, the adsorbing agent has a surface area (BET) from 250 to 5000 m²/g, more preferably from 500 to 3000 m²/g, measured according to ASTM Standard D6556/19.

The amount of the adsorbing agent to be added mainly depends on its nature and on the concentration of contaminants to be separated. For example, in the case of activated carbon, it is preferably added in an amount of from 0.05% to 3% by weight, more preferably from 0.1% to 1% by weight, with respect to the weight of the BHET present in the solution to be purified. The purification step is preferably carried out at a temperature of from 40° C. to 100° C., more preferably from 70° C. to 90° C.

After completion of the purification step, the resulting solution is treated to separate the adsorbing agent from the solution. Such separation may be carried out according to known techniques, preferably by filtration.

BHET and its oligomers may be recovered from the so obtained purified oxidation solution, preferably by precipitation. To that purpose, the solution may be cooled down to a temperature of from 10° C. to 30° C., more preferably from 15° C. to 20° C. BHET and its oligomers may precipitate in an amorphous state or in an at least partially crystalline form, mainly depending on the conditions applied for the precipitation.

The decolorization yield (Y) of the process according to the present invention may be calculated as follows:

$$Y = 100 - (\Sigma abs / \Sigma abs^0) \times 100$$

wherein $\Sigma abs^0$ is the total absorbance of the crude BHET solution at predetermined wavelengths (see above) and tabs is the total absorbance of the purified BHET Solution The following examples are provided for purely illustrative purposes of the present invention and should not be considered as limiting the protection scope defined by the enclosed claims.

EXAMPLES 1-12

A series of tests were carried out on different PET wastes and different solvents as reported in Table 1 above.

The PET waste was subjected to glycolysis according to the following method.

The PET waste was dissolved in EG at 200° C., at reduced pressure (p=0.4 MPa), with a weight ratio EG/PET equal to about 3. The glycolysis reaction was carried out in the presence of $Na_2CO_3$ as heterogeneous catalyst.

The obtained crude BHET solution was then subjected to the purification process. Two different embodiments were used for the purification process as reported hereinbelow.

Process A: BHET Solutions in $EG+H_2O$.

400 g of the crude BHET solution in EG were diluted with osmotic $H_2O$ so as to cause precipitation of a portion of the contaminants (particularly polyamides), which were then separated by filtration. The resulting solution of BHET in EG and $H_2O$, containing 20% w of BHET, was then treated at a temperature $T_{ox}$ with the oxidizing agent in an amount $Q_{ox}$ for a time $t_{ox}$, under stirring.

Process B: BHET Solutions in $H_2O$.

400 g of the crude BHET solution in EG were diluted with osmotic $H_2O$ so as to cause precipitation of a portion of the contaminants (particularly polyamides), which were then separated by filtration. The resulting solution of BHET in a mixture of EG and $H_2O$ was then cooled to 20° C. to cause precipitation of the BHET and its oligomers. The solid was filtered and washed with osmotic $H_2O$ to eliminate residual EG. A BHET cake was obtained which was dried at 70° C./0.9 bar. 80 g of dry BHET powder were added with 148 g of osmotic $H_2O$ at 75°–80° C. The resulting solution, containing 35% w of BHET, was treated at a temperature $T_{ox}$ with the oxidizing agent in an amount $Q_{ox}$ for a time $t_{ox}$, under stirring.

Process C: BHET Solutions in EG.

1000 g of the crude BHET solution in EG, containing 25% w of BHET, was treated at a temperature $T_{ox}$ with the oxidizing agent in an amount $Q_{ox}$ for a time $t_{ox}$, under stirring.

For any of the above processes A, B and C, the solution obtained at the end of the oxidizing treatment, maintained at the same temperature $T_{ox}$, was added with an amount $Q_{ac}$ of activated carbon (particle size: 325 mesh: surface area BET: about 2000 m²/g) and maintained under stirring for 15 min. The activated carbon was then removed by filtration at 75°–80° C., the filtered clear liquid was cooled to 20° C. to obtain crystallization of the BHET. The crystallized BHET was washed with osmotic water and filtered to increase purity. A BHET cake was obtained which was dried at 70° C./0.9 bar.

The experimental conditions for each test are reported in Table 2. $Q_{ox}$ and $Q_{ac}$ are expressed as % w with respect to the BHET weight.

TABLE 2

| Examples | crude solutions | process | oxidizing agent | $T_{ox}$ (° C.) | $t_{ox}$ (min) | $Q_{ox}$ (% w) | $Q_{ac}$ (% w) |
|---|---|---|---|---|---|---|---|
| 1 (*) | 4 | B | none | — | — | — | 2 |
| 2 | 5 | B | NaClO | 75 | 20 | 2.4 | 1 |
| 3 | 5 | C | NaClO | 75 | 20 | 3.0 | 0.5 |
| 4 | 5 | B | NaClO | 75 | 20 | 1.5 | 0.5 |
| 5 | 6 | B | NaClO | 75 | 20 | 0.25 | 0.5 |
| 6 | 6 | A | NaClO | 75 | 20 | 0.025 | 0.5 |
| 7 | 6 | B | NaClO | 75 | 20 | 0.025 | 0.25 |
| 8 | 6 | B | NaClO | 75 | 20 | 0.025 | 0.5 |
| 9 | 6 | B | NaClO$_2$ + H$_2$O$_2$ | 75 | 20 + 34 | 0.25 + 0.35 | 0.5 |
| 10 | 7 | A | NaClO + H$_2$O$_2$ | 75 | 20 + 34 | 0.50 + 1.0 | 0.5 |
| 11 | 7 | A | NaClO + H$_2$O$_2$ | 75 | 20 + 34 | 2.0 + 2.0 | 0.5 |
| 12 | 7 | A | H$_2$O$_2$ + UV | 75 | 34 | 0.03 | 0.5 |

(*) comparative

As regards the oxidizing agents, NaClO was used in the form of aqueous solution with a concentration of 17% w, H$_2$O$_2$ was used in the form of aqueous solution with a concentration of 32% w, NaClO$_2$ was used in the form of aqueous solution with a concentration of 31% w. In Example 12, the UV radiation had a wavelength of 254 nm.

As regards the amount of the oxidizing agent, in Examples 6, 7 and 8 a redox probe was used which allowed, by controlling the redox potential, to remarkably reduce the amount of the oxidizing agent to be used to obtain substantially the same results achieved when such control of the redox potential is not performed.

Color Evaluation.

Two different tests were carried out for each purified BHET in comparison with the crude BHET obtained from glycolysis.

Test 1: Spectrophotometer.

A sample of the dry BHET powder was dissolved in DMSO (1:1 weight ratio) and the solution was introduced into a spectrophotometer for registering the UV-VIS spectrum. The values of Σabs and Y as defined above were determined and reported in Table 3.

Test 2: HunterLab Color Space.

The color of the dry BHET powder was determined by using the Hunter Lab Color Scale according to the Hunter Lab L, a, b Color Space (details about this measurement are reported in the web site https://support.hunterlab.com).

The measurement was made on a cylindrical sample (diameter: 50 mm; height: 10 mm) of the dry BHET powder obtained by compressing the powder in a cylindrical container at 400 bar. The L, a, b parameters were determined as reported in Table 3.

TABLE 3

| Example | Σabs | Y (%) | Hunter Lab Color Scale L | a | b |
|---|---|---|---|---|---|
| 1 (*) | 0.366 | 83.8 | — | — | — |
| 2 | 0.060 | 99.2 | — | — | — |
| 3 | 0.083 | 98.0 | — | — | — |
| 4 | 0.054 | 98.5 | — | — | — |
| 5 | 0.096 | 95.7 | 96.58 | −0.24 | 1.67 |
| 6 | 0.163 | 96.9 | 95.83 | −0.12 | 1.93 |
| 7 | 0.131 | 97.6 | 96.99 | −0.02 | 1.57 |
| 8 | 0.129 | 97.6 | 96.86 | −0.02 | 1.57 |
| 9 | 0.121 | 93.7 | 97.22 | −0.20 | 0.90 |
| 10 | 0.543 | 94.1 | 96.24 | −0.28 | 2.45 |
| 11 | 0.300 | 96.7 | 95.93 | −0.22 | 0.69 |
| 12 | 0.304 | 96.6 | 96.28 | −0.61 | 2.99 |

(*) comparative

From the above results, it is apparent that with the process according to the present invention it is possible to achieve very high decolorization yields (>90%), whereas the treatment with only the activated carbon without oxidation provides a low decolorization yield, even if used in large amounts which are also unsuitable from an economical point of view.

Examples 13-14

The process according to the invention was carried out using chlorine gas as oxidizing agent.

A PET waste having the nominal composition reported in Table 4 was subjected to glycolysis according to the same process used for Examples 1-12. From the glycolysis raw solution, a crude BHET solution (product 9) was obtained by filtration and washing after cooling at room temperature (BHET=25% w, EG=75% w).

Another crude BHET solution (product 10) was obtained by glycolysis of another PET waste having the nominal composition reported in Table 4, followed by dilution with H$_2$O (BHET=20% w, H$_2$O=20% w, EG=60% w), and then by filtration and washing after cooling at room temperature.

The spectral absorption characteristics of the products 9 and 10 before the oxidation treatment are reported in Table 4:

TABLE 4

| PET waste | $abs_{475}$ | $abs_{510}$ | $abs_{570}$ | $abs_{590}$ | $abs_{650}$ | $\Sigma abs^0$ |
|---|---|---|---|---|---|---|
| 9 V PET (50%) + blue flakes (25%) + colored fines (25%) | 0.381 | 0.318 | 0.415 | 0.486 | 0.373 | 1.973 |
| 10 V PET (50%) + blue flakes (25%) + colored fines (25%) | 0.403 | 0.371 | 0.625 | 0.784 | 0.608 | 2.791 |

It is to be noted that the two crude solutions have slightly different colour charges because of the inevitable variability in the composition of the waste materials.

Example 13

1475 g of the crude BHET solution 9 in EG (BHET=25% w, EG=75% w) were heated at 84° C., loaded in a reactor and added with 0.83% w of chlorine gas under stirring for 20 min. The oxidized solution was then diluted with H$_2$O to obtain a solution having the following composition: BHET=25% w, H$_2$O=20% w, EG=55% w. The solution was heated to 85° C. and added with 0.5% w (with respect to the BHET weight) of the same activated carbon used for Examples 2-12, and kept under stirring for 30 min. The activated carbon was then removed by filtration and the decolorized solution was cooled to 15° C. to cause precipitation of BHET. Precipitated BHET was recovered by filtration, washed and subjected to the color evaluation tests by means of a spectrophotometer as reported above. The values of Σabs and Y % were determined and are reported in Table 5.

Example 14

1995 g of the crude BHET solution containing BHET=20% w, H$_2$O=20% w, EG=60% w was treated under stirring at 84° C. with chlorine gas (0.73% w) for 20 min. The oxidized solution was then added with 0.5% w (with respect to the BHET weight) of the same activated carbon used for Examples 2-12, and kept under stirring for 30 min. The activated carbon was then removed by filtration and the decolorized solution was cooled to 15° C. to cause precipitation of BHET. Precipitated BHET was recovered by filtration, washed and subjected to the color evaluation tests by means of a spectrophotometer as reported above. The values of Σabs and Y % were determined and are reported in Table 5.

TABLE 5

| Example | Σabs | Y (%) |
|---------|------|-------|
| 13 | 0.272 | 86.1 |
| 14 | 0.242 | 91.1 |

The invention claimed is:

1. A process for purifying bis(2-hydroxyethyl)terephthalate (BHET), comprising:
   treating a crude BHET solution with at least one oxidizing agent at a temperature of from 30° C. to 100° C. to obtain an oxidized solution;
   treating the oxidized solution with at least one adsorbing agent to obtain a purified oxidized solution; and
   separating the at least one adsorbing agent from the purified oxidized solution to obtain a purified BHET solution;
   wherein the crude BHET solution is obtained by depolymerization of a polyethylene terephthalate (PET) waste; and
   wherein the at least one oxidizing agent comprises at least one inorganic oxidizing agent selected from the group consisting of an alkali metal chlorite, an alkaline-earth metal chlorite, an alkali metal hypochlorite, an alkaline-earth metal hypochlorite, an alkali metal persalt, an alkaline-earth metal persalt, potassium permanganate, hydrogen peroxide, ozone, and chlorine gas.

2. The process according to claim 1, wherein the crude BHET solution is obtained by depolymerization of PET waste by a glycolysis reaction.

3. The process according to claim 2, wherein the glycolysis reaction is carried out by reacting the PET waste with ethylene glycol (EG), optionally in the presence of a heterogeneous transesterification catalyst.

4. The process according to claim 1, wherein:
   the PET waste comprises at least one selected from the group consisting of a transparent PET bottle, a colored PET bottle, an opaque PET article, a multilayer PET article, a printed PET foil, and a PET fiber;
   the PET opaque article comprises PET comprising at least one filler; and
   the multilayer PET article comprises at least one PET layer and at least one selected from the group consisting of a gas barrier polymer layer, a metal foil, and a polyolefin foil.

5. The process according to claim 3, wherein, prior to treating the crude BHET solution with the at least one oxidizing agent, the crude BHET solution is treated to separate contaminants that are not dissolved in EG.

6. The process according to claim 1, wherein, prior to treating the crude BHET solution with the at least one oxidizing agent, water is added to the crude BHET solution to cause precipitation of insoluble contaminants, while maintaining BHET and its oligomers in solution, and the insoluble contaminants are separated from the crude BHET solution.

7. The process according to claim 1, wherein, prior to treating the crude BHET solution with the at least one oxidizing agent, the crude BHET solution is cooled to cause precipitation of BHET and its oligomers, which are then separated and dissolved in water.

8. The process according claim 1, wherein:
   the crude BHET solution has a total absorbance $\Sigma abs^0 = abs_{475} + abs_{510} + abs_{590} + abs_{650}$ of from 1.5 to 12.0;
   $abs_{475}$, $abs_{510}$, $abs_{590}$, and $abs_{650}$ are values of absorbance measured at radiation wavelengths equal to 475, 510, 590, and 650 nm, respectively, for a solution of BHET in dimethylsulphoxide (DMSO); and
   the solution of BHET in DMSO is obtained by drying a sample of the crude BHET solution and dissolving in DMSO at a weight ratio BHET:DMSO of 1:1.

9. The process according to claim 1, wherein the at least one oxidizing agent comprises at least one selected from the group consisting of sodium hypochlorite, potassium hypochlorite, sodium chlorite, potassium chlorite, chlorine gas, and hydrogen peroxide.

10. The process according to claim 1, wherein treating the crude BHET solution with the at least one oxidizing agent comprises treating with hydrogen peroxide and UV radiation.

11. The process according to claim 1, wherein treating the crude BHET solution with the at least one oxidizing agent comprises, in sequence:
   treating with at least one selected from the group consisting of sodium hypochlorite and sodium chlorite; and
   treating with hydrogen peroxide.

12. The process according to claim 1, wherein treating the oxidized solution with the at least one oxidizing agent comprises adding the at least one oxidizing agent in an amount of from 0.005% to 5% by weight based on a total weight of BHET in the crude BHET solution.

13. The process according to claim 1, wherein the at least one adsorbing agent comprises at least one selected from the group consisting of an activated carbon and a silica.

14. The process according to claim 1, wherein the at least one adsorbing agent has a particle size from 50 to 500 mesh, measured according to ASTM Standard D2862/16.

15. The process according to claim 1, wherein the at least one adsorbing agent has a surface area (BET) from 250 to 5000 m$^2$/g, measured according to ASTM Standard D6556/19.

16. The process according to claim 1, wherein:
   the at least one adsorbing agent comprises an activated carbon; and
   treating the oxidized solution with the at least one adsorbing agent comprises adding the activated carbon in an amount of from 0.05% to 3% by weight based on a total weight of BHET in the crude BHET solution.

17. The process according to claim 1, wherein treating the oxidized solution with the at least one adsorbing agent comprises treating at a temperature of from 40° C. to 100° C.

\* \* \* \* \*